US009848073B2

(12) United States Patent
Wang et al.

(10) Patent No.: US 9,848,073 B2
(45) Date of Patent: Dec. 19, 2017

(54) METHODS AND SYSTEMS FOR COMMENCING A PROCESS BASED ON A SOUND TRIGGER

(71) Applicant: Hooloop Corporation, Taipei (TW)

(72) Inventors: Yung-Hsing Wang, Taipei (TW);
Tzu-Han Kuan, Taipei (TW);
Tsung-Yin Li, Taipei (TW)

(73) Assignee: HOOLOOP CORPORATION, Taipei (TW)

( * ) Notice: Subject to any disclaimer, the term of this patent is extended or adjusted under 35 U.S.C. 154(b) by 178 days.

(21) Appl. No.: 14/658,615

(22) Filed: Mar. 16, 2015

(65) Prior Publication Data

US 2015/0296069 A1    Oct. 15, 2015

(30) Foreign Application Priority Data

Apr. 10, 2014 (TW) .............................. 103113167 A

(51) Int. Cl.
| | |
|---|---|
| H04M 1/725 | (2006.01) |
| G06F 3/16 | (2006.01) |
| G06F 1/16 | (2006.01) |
| G10L 15/20 | (2006.01) |
| G06F 3/01 | (2006.01) |

(52) U.S. Cl.
CPC ...... H04M 1/72522 (2013.01); G06F 1/1684 (2013.01); G06F 1/1694 (2013.01); G06F 3/017 (2013.01); G06F 3/165 (2013.01); G10L 15/20 (2013.01); G06F 2200/1636 (2013.01); G06F 2200/1637 (2013.01)

(58) Field of Classification Search
CPC ............. H04M 1/271; H04M 1/72519; H04M 1/6041; H04M 2250/74; H04M 1/72522; G10L 15/265; G10L 15/20; G06F 1/1694; G06F 1/1684; G06F 3/017; G06F 3/165; G06F 2200/1636; G06F 2200/1637
See application file for complete search history.

(56) References Cited

U.S. PATENT DOCUMENTS

| | | | |
|---|---|---|---|
| 2008/0165022 | A1 | 7/2008 | Herz et al. |
| 2009/0264108 | A1* | 10/2009 | Li ....................... H04M 1/6505 455/413 |
| 2011/0142273 | A1* | 6/2011 | Iwano ................... H04R 25/70 381/321 |
| 2014/0334645 | A1* | 11/2014 | Yun ........................ G10L 15/08 381/110 |
| 2015/0068922 | A1* | 3/2015 | Mackintosh ....... G01N 27/3274 205/777.5 |

FOREIGN PATENT DOCUMENTS

| | | |
|---|---|---|
| EP | 2375775 A1 | 10/2011 |
| EP | 2584459 A1 | 4/2013 |

* cited by examiner

*Primary Examiner* — Ted Wang
(74) *Attorney, Agent, or Firm* — McClure, Qualey & Rodack, LLP

(57) ABSTRACT

Methods and systems for commencing a process based on a sound trigger are provided. First, a sound is received via a sound reception unit. When an intensity difference between the intensity of the sound at a specific time point and the intensity of the sound at a preceding time point is greater than a predefined value, a process in the electronic device is performed. In some embodiments, the sound is caused by tapping the electronic device.

14 Claims, 10 Drawing Sheets

METHODS AND SYSTEMS FOR COMMENCING A PROCESS BASED ON A SOUND TRIGGER

BACKGROUND OF THE INVENTION

Field of the Invention

The disclosure relates generally to methods and systems for commencing a process based on a sound trigger, and, more particularly to methods and systems that can commence a process in an electronic device according to the sound received by the electronic device.

Description of the Related Art

Recently, electronic devices, such as smart phones, notebooks, wearable devices or other portable devices, have become more and more technically advanced and multifunctional. For example, a portable device may have network connecting capabilities. Users can use their portable devices to connect to networks anytime and anywhere. Due to increased convenience and expanded functionalities of the devices, these devices have become necessities of life.

Generally, an electronic device can have a touch-sensitive interface. Users can input related commands to the electronic device by tapping or moving their fingers on the touch-sensitive interface, to perform and operate the processes corresponding to various applications in the electronic device. However, unintentional touches of the touch-sensitive interface become burdensome for users. For example, an electronic device can have a function, in which users can wake up the electronic device by tapping a touch-sensitive screen of the electronic device when the screen is in a hibernate mode. However, as an unintended consequence of this function, the electronic device may execute unexpected processes due to unintentional touches by a user.

Additionally, an application can be executed in an electronic device that makes relying on a touch-sensitive screen for input inconvenient. When a user wants to input related data to the electronic device via the touch-sensitive screen, the user must first suspend the execution of the application, input related data to the electronic device via the touch-sensitive screen, and then resume the execution of the application. For example, a user can make a phone call by using an electronic device. When related data needs to be input to the device during the call, the user must remove the electronic device from the user's ear, and input data to the electronic device via the touch-sensitive screen. After data is input to the device, the electronic device is moved back to the user's ear to continue the call. The above operations are inconvenient for users.

BRIEF SUMMARY OF THE INVENTION

Methods and systems for commencing a process based on a sound trigger are provided, in which a process in an electronic device can be commenced according to the sound received by the electronic device.

In an embodiment of a method for commencing a process based on a sound trigger, a sound is received via a sound reception unit. It is determined whether an intensity difference between the intensity of the sound at a specific time point and the intensity of the sound at a preceding time point is greater than a predefined value. When the intensity difference between the intensity of the sound at the specific time point and the intensity of the sound at the preceding time point is greater than the predefined value, a process in the electronic device is performed.

An embodiment of a system for commencing a process based on a sound trigger comprises a sound reception unit and a processing unit. The sound reception unit receives a sound. The processing unit determines whether an intensity difference between the intensity of the sound at a specific time point and the intensity of the sound at a preceding time point is greater than a predefined value. When the intensity difference between the intensity of the sound at the specific time point and the intensity of the sound at the preceding time point is greater than the predefined value, the processing unit performs a process in the electronic device.

In some embodiments, the sound is caused by tapping the electronic device.

In some embodiments, it is determined whether the intensity of the sound at the specific time point is greater than a specific threshold value. When the intensity of the sound at the specific time point is greater than the specific threshold value, and the intensity difference is greater than the predefined value, a process in the electronic device is performed.

In some embodiments, a motion of the electronic device can be detected by a sensor of the electronic device when the sound is received. It is determined whether the motion indicates that the electronic device generates a displacement along at least one specific axis at the specific time point. When the motion indicates that the electronic device generates a displacement along the specific axis at the specific time point, and the intensity difference is greater than the predefined value, a process in the electronic device is performed.

In some embodiments, it is determined whether a first specific time point and a second specific time point during the sound is received are within a time interval, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value. When the first specific time point and the second specific time point are within the time interval, a process in the electronic device is performed. In some embodiments, it is determined whether a time difference between the first specific time point and the second specific time point conforms to a predefined value. When the time difference conforms to the predefined value, a process in the electronic device is performed.

In some embodiments, a specific time difference can be obtained from a specific electronic device. It is determined whether a time difference between a first specific time point and a second specific time point conforms to the specific time difference, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value. When the time difference between the first specific time point and the second specific time point conforms to the specific time difference, a process in the electronic device is performed. In some embodiments, data is exchanged between the electronic device and the specific electronic device when the process is performed.

In some embodiments, a presence of an object can be detected by a proximity sensor of the electronic device. When the presence of an object is detected, and the intensity difference is greater than the predefined value, the process in the electronic device is performed. In some embodiments, a plurality of voice messages are provided in the electronic device, and a voice playback process for the voice messages is performed. The above process can control at least one function of the voice playback process.

In an embodiment of a method for commencing a process based on a sound trigger, a sound is received via a sound reception unit. It is determined whether the intensity of the sound at minimally one specific time point is greater than a specific threshold value. A motion of the electronic device is detected by a sensor of the electronic device when the sound is received. It is determined whether the motion indicates that the electronic device generates a displacement along at least one specific axis at the specific time point. When the motion indicates that the electronic device generates a displacement along the specific axis at the specific time point, and the intensity of the sound at the specific time point is greater than the specific threshold value, a process in the electronic device is performed.

An embodiment of a system for commencing a process based on a sound trigger comprises a sound reception unit, a sensor, and a processing unit. The sound reception unit receives a sound. The sensor detects a motion of the electronic device when the sound is received. The processing unit determines whether the intensity of the sound at minimally one specific time point is greater than a specific threshold value, and whether the motion indicates that the electronic device generates a displacement along at least one specific axis at the specific time point. When the motion indicates that the electronic device generates a displacement along the specific axis at the specific time point, and the intensity of the sound at the specific time point is greater than the specific threshold value, the processing unit performs a process in the electronic device.

Methods and systems for commencing a process based on a sound trigger may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for commencing a process based on a sound trigger are provided.

Figure 1:
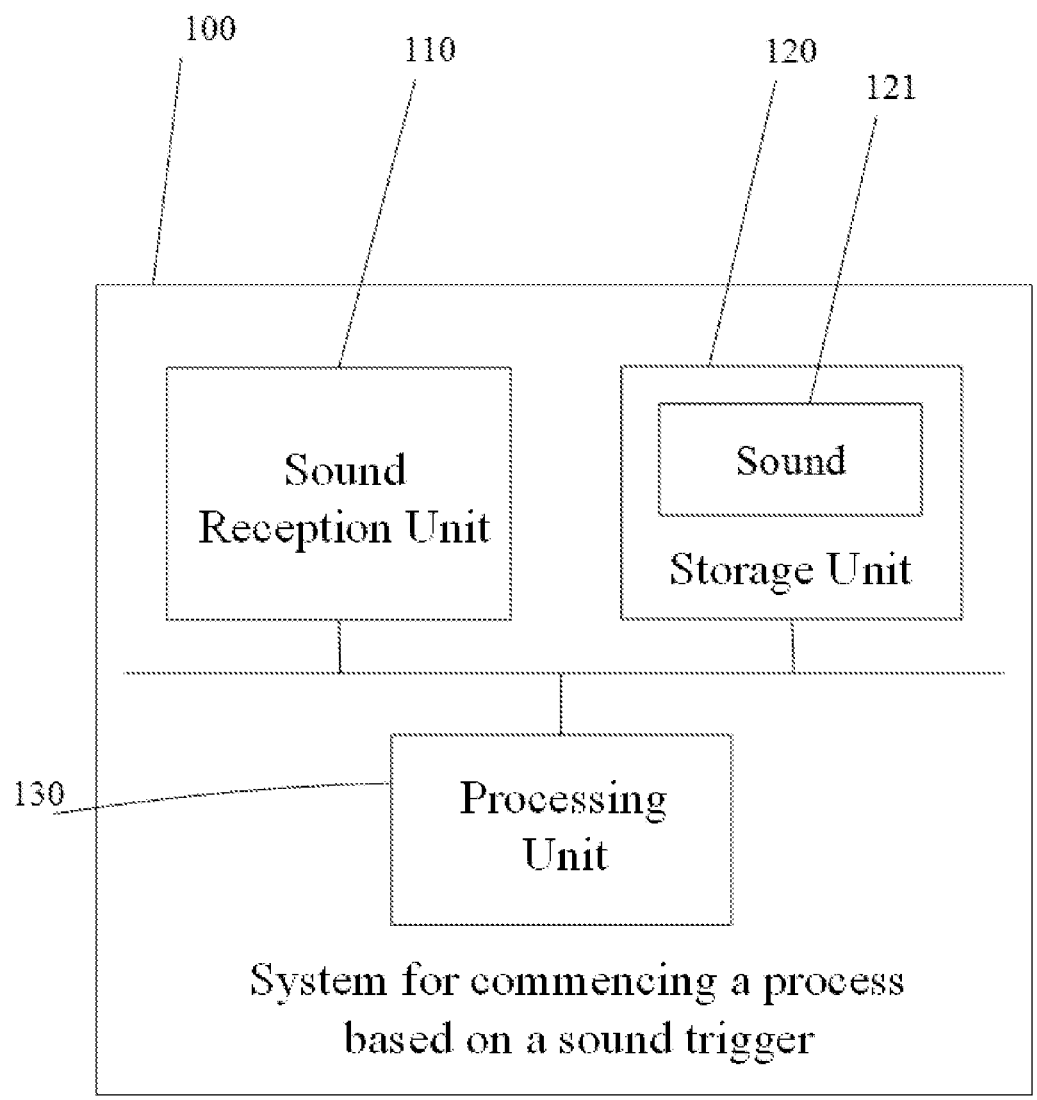
FIG. 1 is a schematic diagram illustrating an embodiment of a system for commencing a process based on a sound trigger of the invention.

FIG. 1 is a schematic diagram illustrating an embodiment of a system for commencing a process based on a sound trigger of the invention. The system for commencing a process based on a sound trigger can be used in an electronic device, such as a computer, or a portable device, such as a mobile phone, a smart phone, a PDA (Personal Digital Assistant), a GPS (Global Positioning System), a notebook, or a wearable device.

Figure 2:
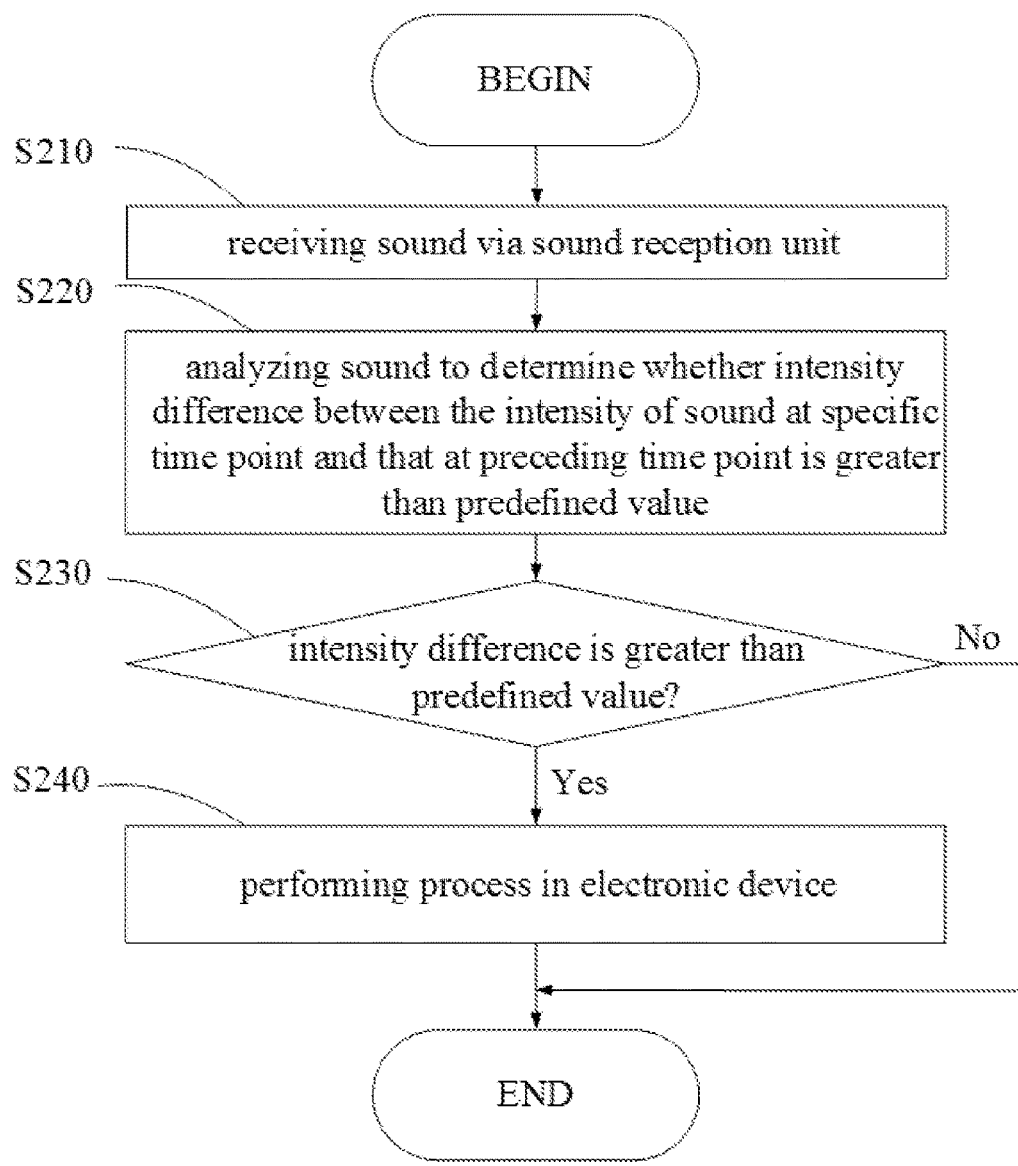
FIG. 2 is a flowchart of an embodiment of a method for commencing a process based on a sound trigger of the invention.

The system for commencing a process based on a sound trigger 100 can comprise a sound reception unit 110, a storage unit 120, and a processing unit 130. The sound reception unit 110 may be a microphone for receiving sounds. The storage unit 120 can store the sound 121. Additionally, the storage unit 120 can store related data, such as images, interfaces and information. The processing unit 130 can control related operations of hardware and software in the electronic device, and perform the methods for commencing a process based on a sound trigger of the present invention, which will be discussed later. It is understood that, in some embodiments, the system for commencing a process based on a sound trigger 100 can comprise at least one sensor (not shown in FIG. 1) for detecting a motion of the electronic device. It is noted that, in some embodiments, the sensor may be an accelerometer for generating information of velocity and displacement when the electronic device moves. In some embodiments, the sensor may be a Gyro sensor for generating information of angular acceleration when the electronic device moves. It is noted that, the above sensors are only examples of the present invention, and the present invention is not limited thereto. Any sensor which can detect the motion of an electronic device can be applied in the present invention. It is understood that, in some embodiments, the system for commencing a process based on a sound trigger 100 can comprise a proximity sensor (not shown in FIG. 1) for detecting a presence of an object. That is the proximity sensor can determine whether an object approaches the electronic device. It is noted that, in some embodiments, the proximity sensor can be set at the front of the electronic device. For example, when the electronic device is a smart phone having a touch-sensitive screen, the proximity sensor and the touch-sensitive screen can be set at the same side of the smart phone. In some cases, the proximity sensor can be set at a position nearby a voice output unit, such as the earphone of a smart phone. Additionally, in some embodiments, the system for commencing a process based on a sound trigger 100 can comprise a network connecting unit (not shown in FIG. 1), for connecting to a network, such as a wired network, a telecommunication network, or a wireless network such as Bluetooth or Wi-Fi network. The electronic device can have network connecting capabilities by using the network connecting unit FIG. 2 is a flowchart of an embodiment of a method for commencing a process based on a sound trigger of the invention. The method for commencing a process based on a sound trigger can be used in an electronic device, such as a computer, or a portable device, such as a mobile phone, a smartphone, a PDA, a GPS, a notebook, or a wearable device.

Figure 3:
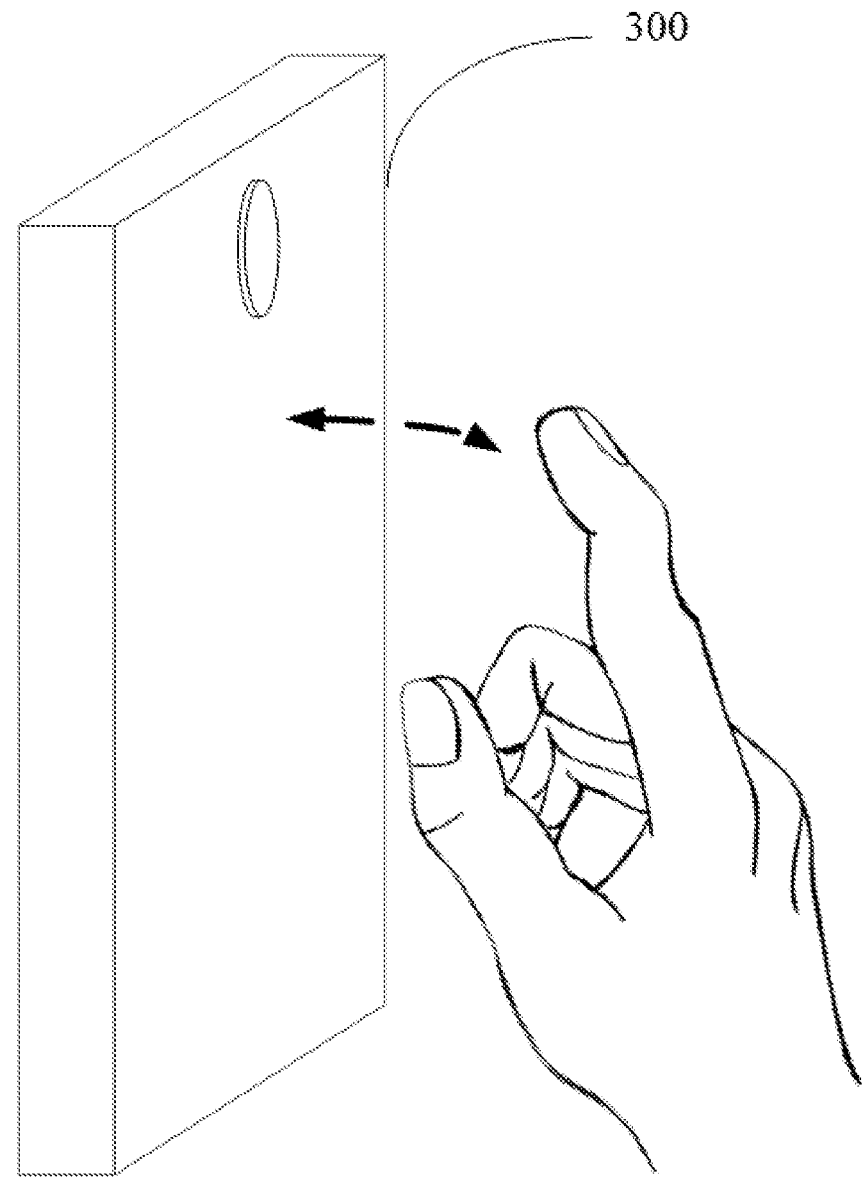
FIG. 3 is a schematic diagram illustrating an example of process commencement of the invention.
Figure 4:
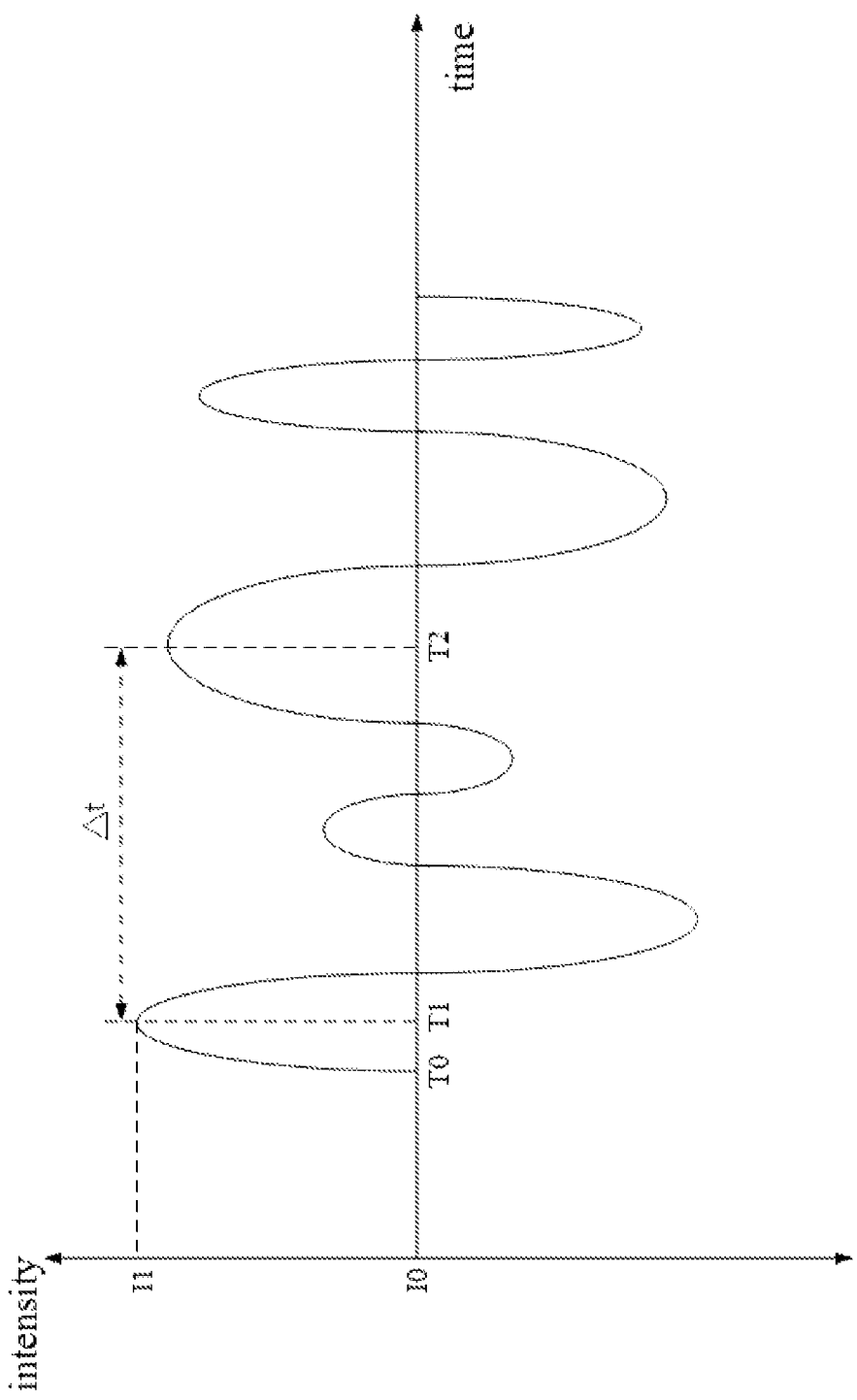
FIG. 4 is a schematic diagram illustrating an example of sound waves.

In step S210, a sound is received via a sound reception unit, such as a microphone of the electronic device. FIG. 3 is a schematic diagram illustrating an example of process commencement of the invention. In the example, a user can use an object, such as a finger to tap the back of an electronic device 300 to generate a sound. It is understood that, tapping the back of the electronic device 300 for generating a sound is only an example of the present invention. Any manner for generating a sound can be applied in the present invention. In step S220, the sound is analyzed, and in step S230, it is determined whether an intensity difference between the intensity of the sound at minimally one specific time point and the intensity of the sound at a preceding time point is greater than a predefined value. For example, FIG. 4 is a schematic diagram illustrating an example of sound waves, in which the intensity of a sound at a specific time point T1 is I1, and the intensity of the sound at a preceding time point T0 of the specific time point T1 is I0. It is determined whether the intensity difference (I1-I0) between the intensity of the sound at T1 and the intensity of the sound at T0 is greater than a predefined value. When the intensity difference between the intensity of the sound at the specific time point and the intensity of the sound at the preceding time point is not greater than the predefined value (No in step S230), the procedure is complete. When the intensity difference between the intensity of the sound at the specific time point and the intensity of the sound at the preceding time point is greater than the predefined value (Yes in step S230), in step S240, a process in the electronic device is performed. It is understood that, in some embodiments, the process may be an unlock process for the electronic device. In some embodiments, the process may be an operational process for a user interface of the electronic device. In some embodiments, the process may be an activation process for an application in the electronic device. It is understood that, above processes are only examples of the present invention, and the present invention is not limited thereto.

It is understood that, in some embodiments, it is further determined whether an intensity difference between the intensity of the sound at the specific time point and the intensity of the sound at a succeeding time point is greater than a specific predefined value. For example, when the intensity of the sound at the specific time point is greater than the intensity of the sound at the succeeding time point, and the intensity difference between the intensity of the sound at the specific time point and the intensity of the sound at the succeeding time point is greater than the specific predefined value, the process in the electronic device is performed. It is understood that, in some embodiments, it is determined whether the intensity of the sound at the specific time point is greater than a specific threshold value. When the intensity of the sound at the specific time point is greater than the specific threshold value, and the intensity difference is greater than the predefined value, the process in the electronic device is performed. It is noted that, in some embodiments, a first specific time point and a second specific time point may exist while the sound is being received, in which the intensity difference between the intensity of the sound at the first specific time point and the intensity of the sound at the preceding time point is greater than the pre-defined value, and the intensity difference between the intensity of the sound at the second specific time point and the intensity of the sound at the preceding time point is greater than the predefined value. It is determined whether the first specific time point and the second specific time point are within a time interval. When the first specific time point and the second specific time point are within the time interval, the process in the electronic device is performed. Additionally, in some embodiments, it is determined whether a time difference between the first specific time point and the second specific time point conforms to a predefined value. When the time difference conforms to the predefined value, the process in the electronic device is performed. Referring to FIG. 4 again, in the example, it is determined whether the time difference ($\Delta t$) between the specific time points T1 and T2 during the sound is received conforms to a predefined value. When the time difference ($\Delta t$) conforms to the predefined value, the process in the electronic device is performed.

Figure 5:
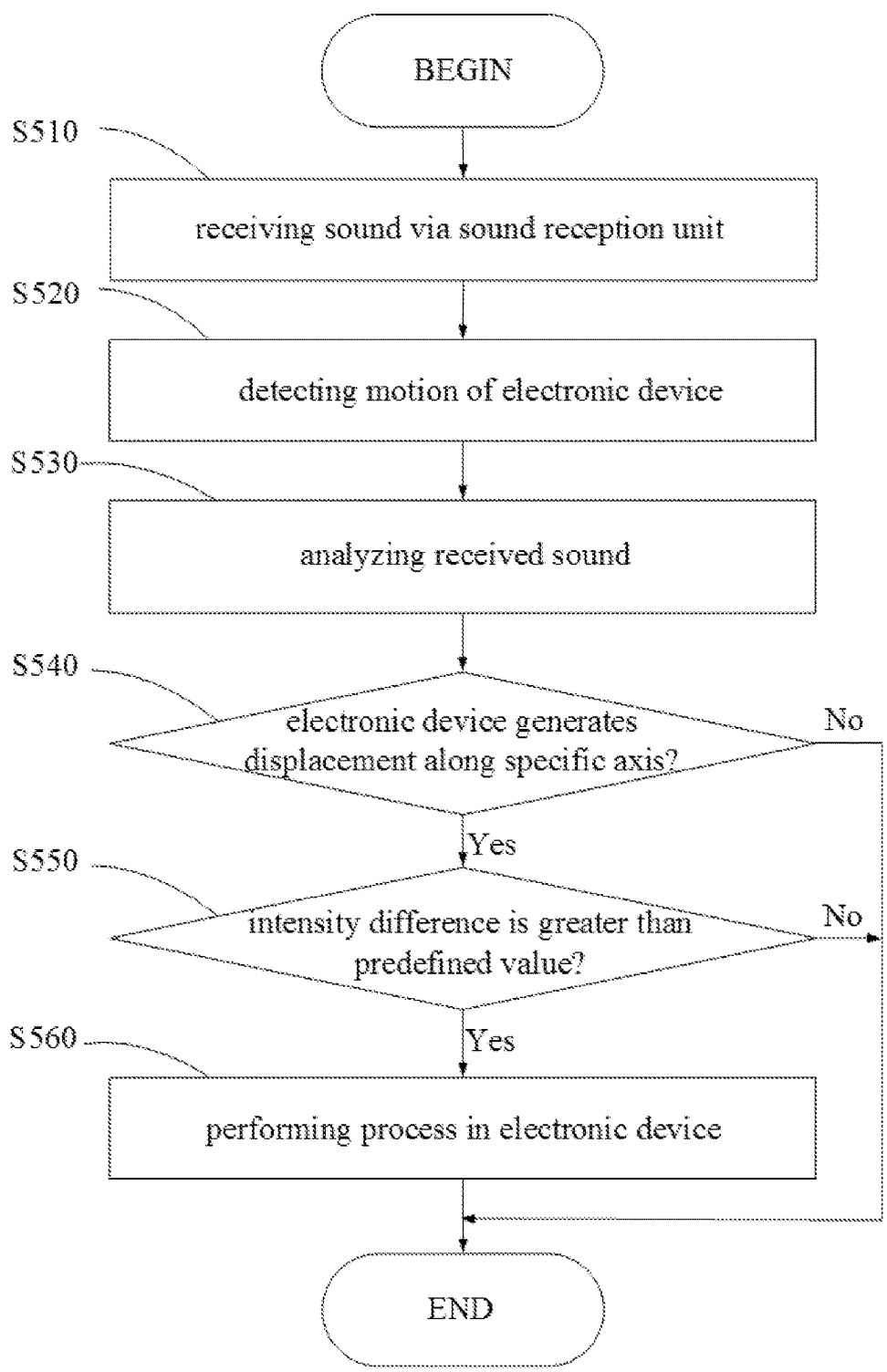
FIG. 5 is a flowchart of another embodiment of a method for commencing a process based on a sound trigger of the invention.

FIG. 5 is a flowchart of another embodiment of a method for commencing a process based on a sound trigger of the invention. The method for commencing a process based on a sound trigger can be used in an electronic device, such as a computer, or a portable device, such as a mobile phone, a smartphone, a PDA, a GPS, a notebook, or a wearable device.

Figure 6:
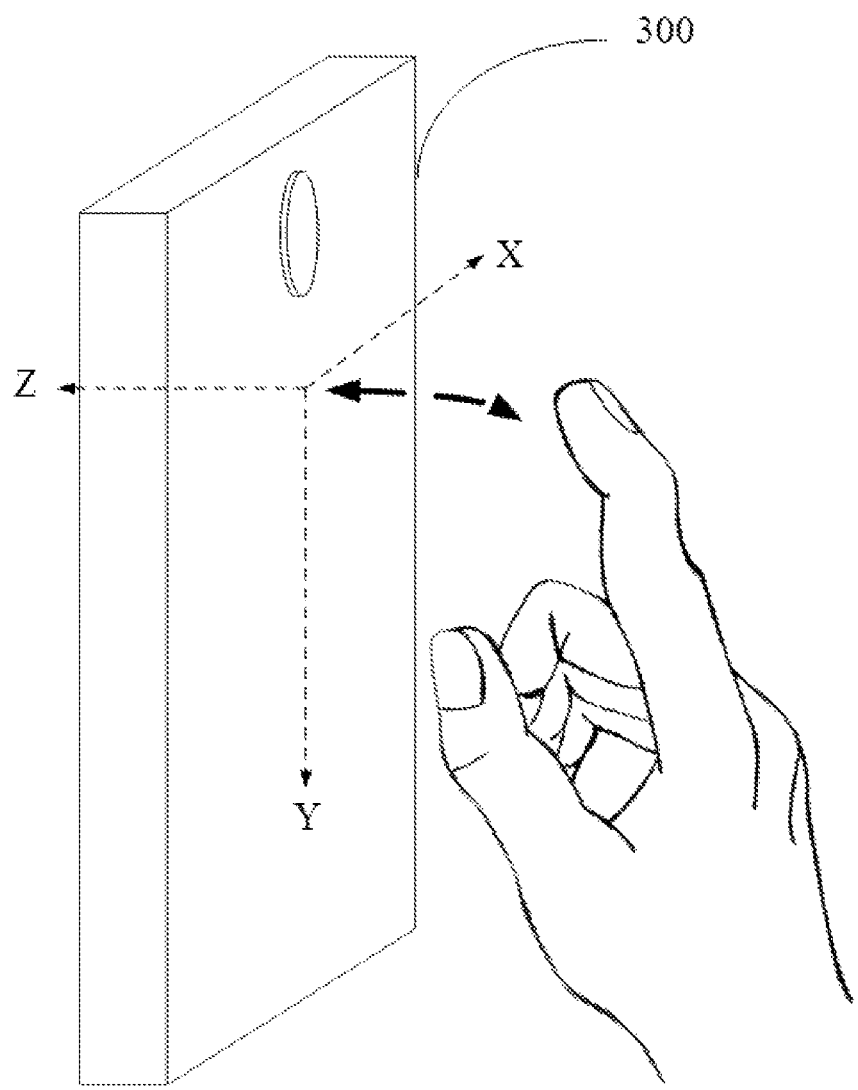
FIG. 6 is a schematic diagram illustrating an embodiment of a specific axis corresponding to an electronic device of the invention.

In step S510, a sound is received via a sound reception unit, such as a microphone of the electronic device. As described, in some embodiments, a user can use an object, such as a finger to tap the back of an electronic device to generate a sound. It is noted that, tapping the back of the electronic device for generating a sound is only an example of the present invention. Any manner for generating a sound can be applied in the present invention. During the reception of the sound, in step S520, a motion of the electronic device is detected by at least one sensor of the electronic device. It is understood that, in some embodiments, the sensor may be an accelerometer for generating information of velocity and displacement when the electronic device moves. In some embodiments, the sensor may be a Gyro sensor for generating information of angular acceleration when the electronic device moves. A variation of displacement, velocity, and/or angular acceleration generated in a predefined interval in which the motion of the electronic device occurred can be recorded. It is noted that, the above sensors are only examples of the present invention, and the present invention is not limited thereto. Any sensor which can detect the motion of an electronic device can be applied in the present invention. Then, in step S530, the sound is analyzed. In step S540, it is determined whether the motion indicates that the electronic device generates a displacement along at least one specific axis at minimally one specific time point when the sound is received. FIG. 6 is a schematic diagram illustrating an embodiment of a specific axis corresponding to an electronic device of the invention. As shown in FIG. 6, the electronic device 600 may have X, Y and Z axes. In some embodiments, the specific axis may be the Z axis, which substantially parallels the direction of the finger tapping the electronic device. It is noted that, the above specific axis is only an example of the present invention, and the present invention is not limited thereto. Additionally, in some embodiments, it is determined whether the motion indicates that the electronic device generates displacement along multiple axes at the specific time point. For example, it is determined whether the detected motion indicates that the electronic device generates displacement along Y and Z axes. When the motion does not indicate that the electronic device generates a displacement along the specific axis at the specific time point (No in step S540), the procedure is complete. When the motion indicates that the electronic device generates a displacement along the specific axis at the specific time point (Yes in step S540), in step S550, it is determined whether an intensity difference between the intensity of the sound at the specific time point and the intensity of the sound at a preceding time point is greater than a predefined value. When the intensity difference between the intensity of the sound at the specific time point and the intensity of the sound at the preceding time point is not greater than the predefined value (No in step S550), the procedure is complete. When the intensity difference between the intensity of the sound at the specific time point and the intensity of the sound at the preceding time point is greater than the predefined value (Yes in step S550), in step S560, a process in the electronic device is performed. Similarly, the present invention is not limited to any process.

Similarly, in some embodiments, it is further determined whether an intensity difference between the intensity of the sound at the specific time point and the intensity of the sound at a succeeding time point is greater than a specific predefined value. For example, when the intensity of the sound at the specific time point is greater than the intensity of the sound at the succeeding time point, and the intensity difference between the intensity of the sound at the specific time point and the intensity of the sound at the succeeding time point is greater than the specific predefined value, the process in the electronic device is performed. In some embodiments, it is determined whether the intensity of the sound at the specific time point is greater than a specific threshold value. When the intensity of the sound at the specific time point is greater than the specific threshold value, and the intensity difference is greater than the predefined value, the process in the electronic device is performed. It is noted that, in some embodiments, a first specific time point and a second specific time point may exist while the sound is being received, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value. It is determined whether the first specific time point and the second specific time point are within a time interval. When the first specific time point and the second specific time point are within the time interval, the process in the electronic device is performed. Additionally, in some embodiments, it is determined whether a time difference between the first specific time point and the second specific time point conforms to a predefined value. When the time difference conforms to the predefined value, the process in the electronic device is performed.

Figure 7:
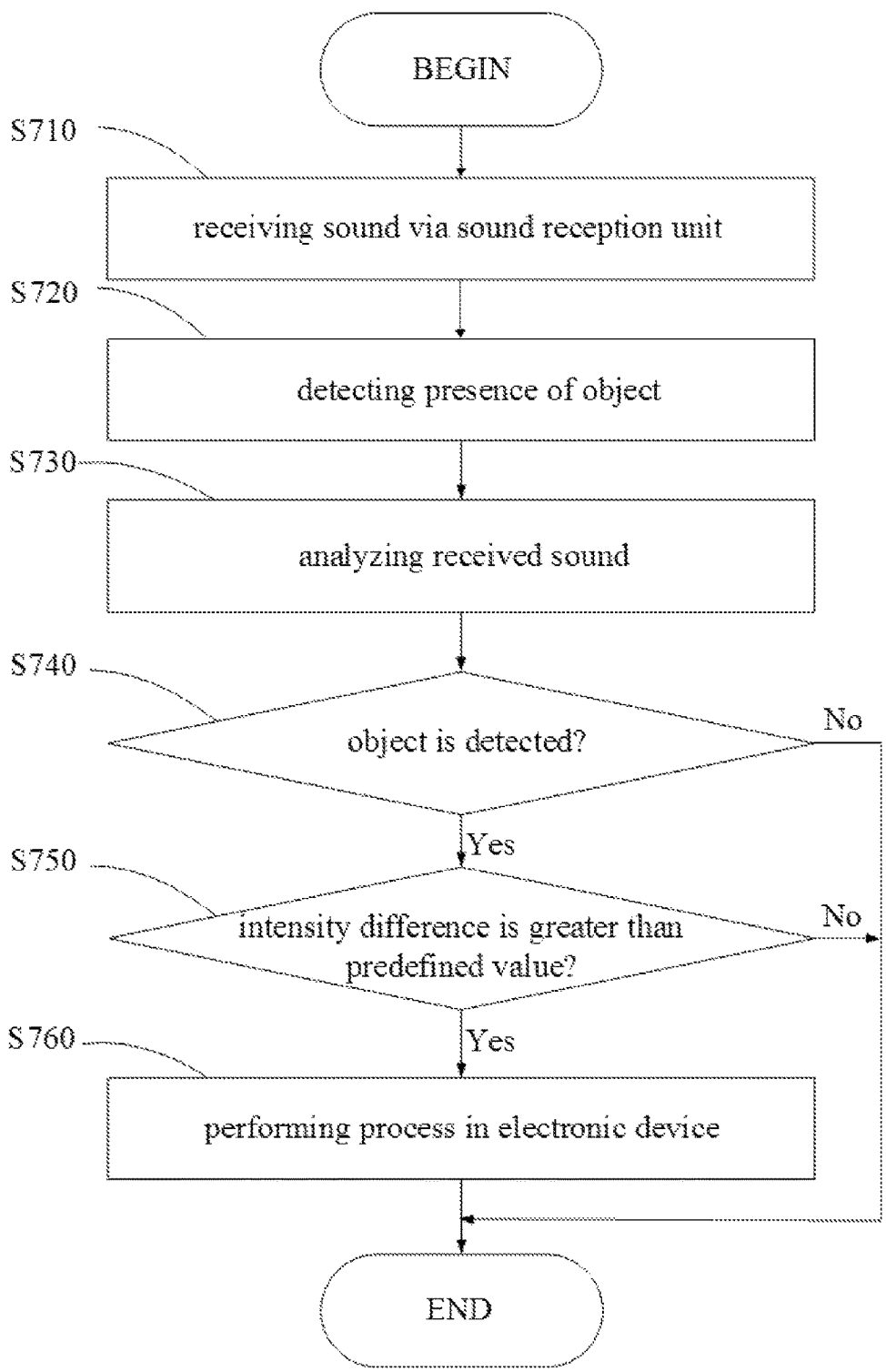
FIG. 7 is a flowchart of another embodiment of a method for commencing a process based on a sound trigger of the invention.

FIG. 7 is a flowchart of another embodiment of a method for commencing a process based on a sound trigger of the invention. The method for commencing a process based on a sound trigger can be used in an electronic device, such as a computer, or a portable device, such as a mobile phone, a smartphone, a PDA, a GPS, a notebook, or a wearable device.

In step S710, a sound is received via a sound reception unit, such as a microphone of the electronic device. As described, in some embodiments, a user can use an object, such as a finger to tap the back of an electronic device to generate a sound. It is noted that, tapping the back of electronic device for generating a sound is only an example of the present invention. Any manner for generating a sound can be applied in the present invention. During the reception of the sound, in step S720, a presence of an object is detected by a proximity sensor of the electronic device. It is understood that, in some embodiments, when the electronic device is a smart phone having a touch-sensitive screen, the proximity sensor and the touch-sensitive screen can be set at the same side of the smart phone. In some cases, the proximity sensor can be set at a position nearby a voice output unit, such as the earphone of a smart phone. Then, in step S730, the sound is analyzed. In step S740, it is determined whether a presence of an object is detected by a proximity sensor at minimally one specific time point when the sound is received. When the presence of an object is not detected (No in step S740), the procedure is complete. When the presence of an object is detected (Yes in step S740), in step S750, it is determined whether an intensity difference between the intensity of the sound at the specific time point and the intensity of the sound at a preceding time point is greater than a predefined value. When the intensity difference between the intensity of the sound at the specific time point and the intensity of the sound at the preceding time point is not greater than the predefined value (No in step S750), the procedure is complete. When the intensity difference between the intensity of the sound at the specific time point and the intensity of the sound at the preceding time point is greater than the predefined value (Yes in step S750), in step S760, a process in the electronic device is performed. Similarly, the present invention is not limited to any process.

Similarly, in some embodiments, it is further determined whether an intensity difference between the intensity of the sound at the specific time point and the intensity of the sound at a succeeding time point is greater than a specific predefined value. For example, when the intensity of the sound at the specific time point is greater than the intensity of the sound at the succeeding time point, and the intensity difference between the intensity of the sound at the specific time point and the intensity of the sound at the succeeding time point is greater than the specific predefined value, the process in the electronic device is performed. In some embodiments, it is determined whether the intensity of the sound at the specific time point is greater than a specific threshold value. When the intensity of the sound at the specific time point is greater than the specific threshold value, and the intensity difference is greater than the predefined value, the process in the electronic device is performed. It is noted that, in some embodiments, a first specific time point and a second specific time point may exist while the sound is being received, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value. It is determined whether the first specific time point and the second specific time point are within a time interval. When the first specific time point and the second specific time point are within the time interval, the process in the electronic device is performed. Additionally, in some embodiments, it is determined whether a time difference between the first specific time point and the second specific time point conforms to a predefined value. When the time difference conforms to the predefined value, the process in the electronic device is performed.

It is noted that, in some embodiments, a plurality of voice messages can be provided in the electronic device, and a voice playback process for the voice messages is performed. When a user moves the electronic device to the user's ear to hear the voice messages, the proximity sensor of the electronic device will detect the presence of an object (ear). At this time, the user can use a finger to tap the back of the electronic device to generate a sound, such that the electronic device can commence related operational functions corresponding to the voice playback process according to the sound. For example, when the user uses the finger to tap the electronic device twice in a predefined interval, a voice message next to the voice message which is currently played is played. When the user uses the finger to tap the electronic device three times in a predefined interval, a voice message prior to the voice message which is currently played is played. In the example, the user can directly input related commands to the electronic device to control related operations without repeatedly moving the electronic device.

Figure 8:
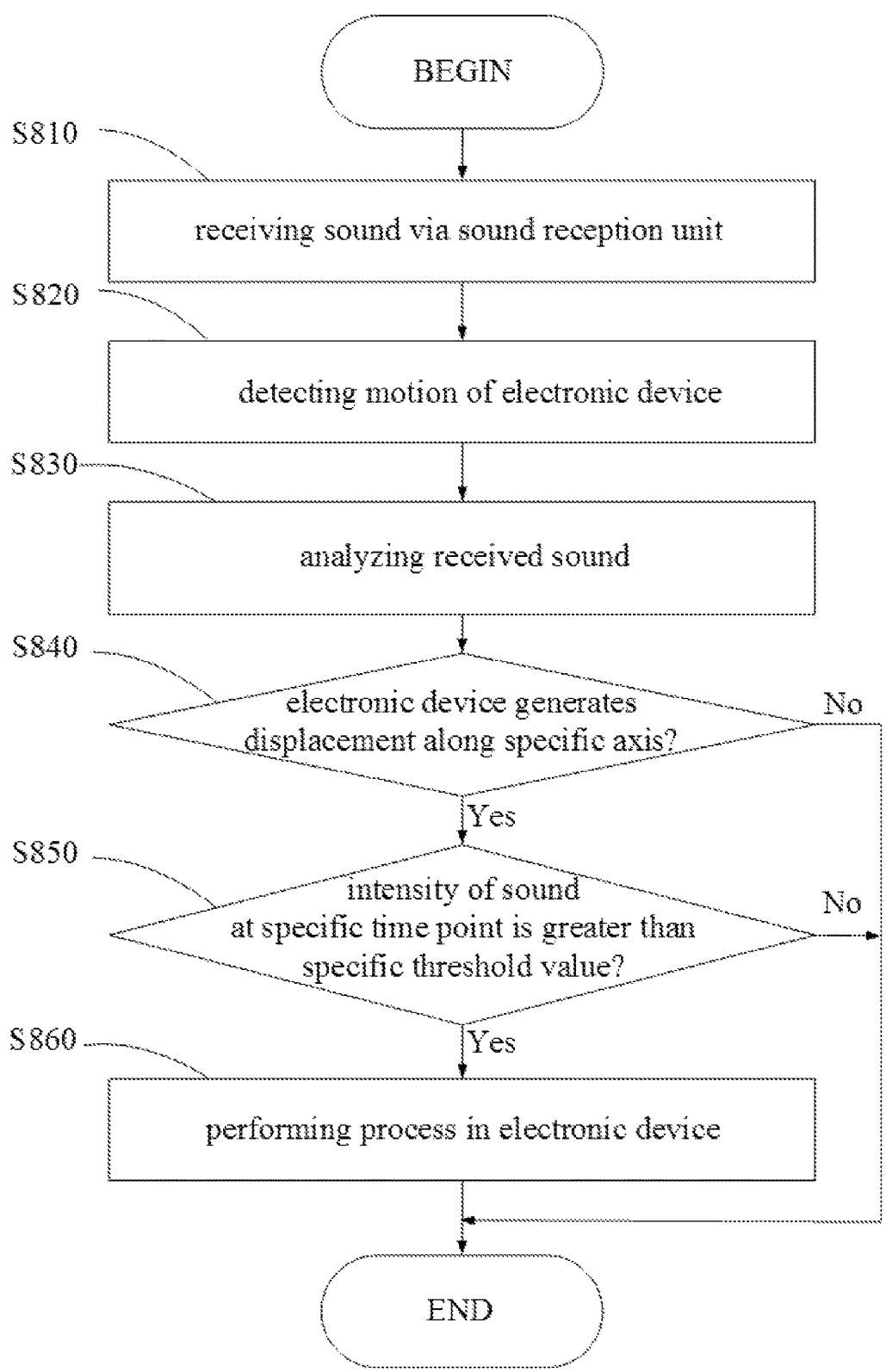
FIG. 8 is a flowchart of another embodiment of a method for commencing a process based on a sound trigger of the invention.

FIG. 8 is a flowchart of another embodiment of a method for commencing a process based on a sound trigger of the invention. The method for commencing a process based on a sound trigger can be used in an electronic device, such as a computer, or a portable device, such as a mobile phone, a smartphone, a PDA, a GPS, a notebook, or a wearable device. In step S810, a sound is received via a sound reception unit, such as a microphone of the electronic device. As described, in some embodiments, a user can use an object, such as a finger to tap the back of an electronic device to generate a sound. It is noted that, tapping the back of the electronic device for generating a sound is only an example of the present invention. Any manner for generating a sound can be applied in the present invention. During the reception of the sound, in step S820, a motion of the electronic device is detected by at least one sensor of the electronic device. It is understood that, in some embodiments, the sensor may be an accelerometer for generating information of velocity and displacement when the electronic device moves. In some embodiments, the sensor may be a Gyro sensor for generating information of angular acceleration when the electronic device moves. A variation of a displacement, a velocity, and/or an angular acceleration generated in a predefined interval in which the motion of the electronic device occurred can be recorded. It is noted that, the above sensors are only examples of the present invention, and the present invention is not limited thereto. Any sensor which can detect the motion of an electronic device can be applied in the present invention. Then, in step S830, the sound is analyzed. In step S840, it is determined whether the motion indicates that the electronic device generates a displacement along at least one specific axis at minimally one specific time point when the sound is received. It is understood that, in some embodiments, the specific axis may be the Z axis, which substantially parallels the direction of the finger tapping the electronic device. It is noted that, the above specific axis is only an example of the present invention, and the present invention is not limited thereto. Similarly, in some embodiments, it is determined whether the motion indicates that the electronic device generates displacements along multiple axes at the specific time point. For example, it is determined whether the detected motion indicates that the electronic device generates displacements along Y and Z axes. When the motion does not indicate that the electronic device generates a displacement along the specific axis at the specific time point (No in step S840), the procedure is complete. When the motion indicates that the electronic device generates a displacement along the specific axis at the specific time point (Yes in step S840), in step S850, it is determined whether the intensity of the sound at the specific time point is greater than a specific threshold value. When the intensity of the sound at the specific time point is not greater than a specific threshold value (No in step S850), the procedure is complete. When the intensity of the sound at the specific time point is greater than a specific threshold value (Yes in step S850), in step S860, a process in the electronic device is performed. Note that the present invention is not limited to any process.

Similarly, in some embodiments, a first specific time point and a second specific time point may exist while the sound is being received, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value. It is determined whether the first specific time point and the second specific time point are within a time interval. When the first specific time point and the second specific time point are within the time interval, the process in the electronic device is performed. Additionally, in some embodiments, it is determined whether a time difference between the first specific time point and the second specific time point conforms to a predefined value. When the time difference conforms to the predefined value, the process in the electronic device is performed.

Figure 9:
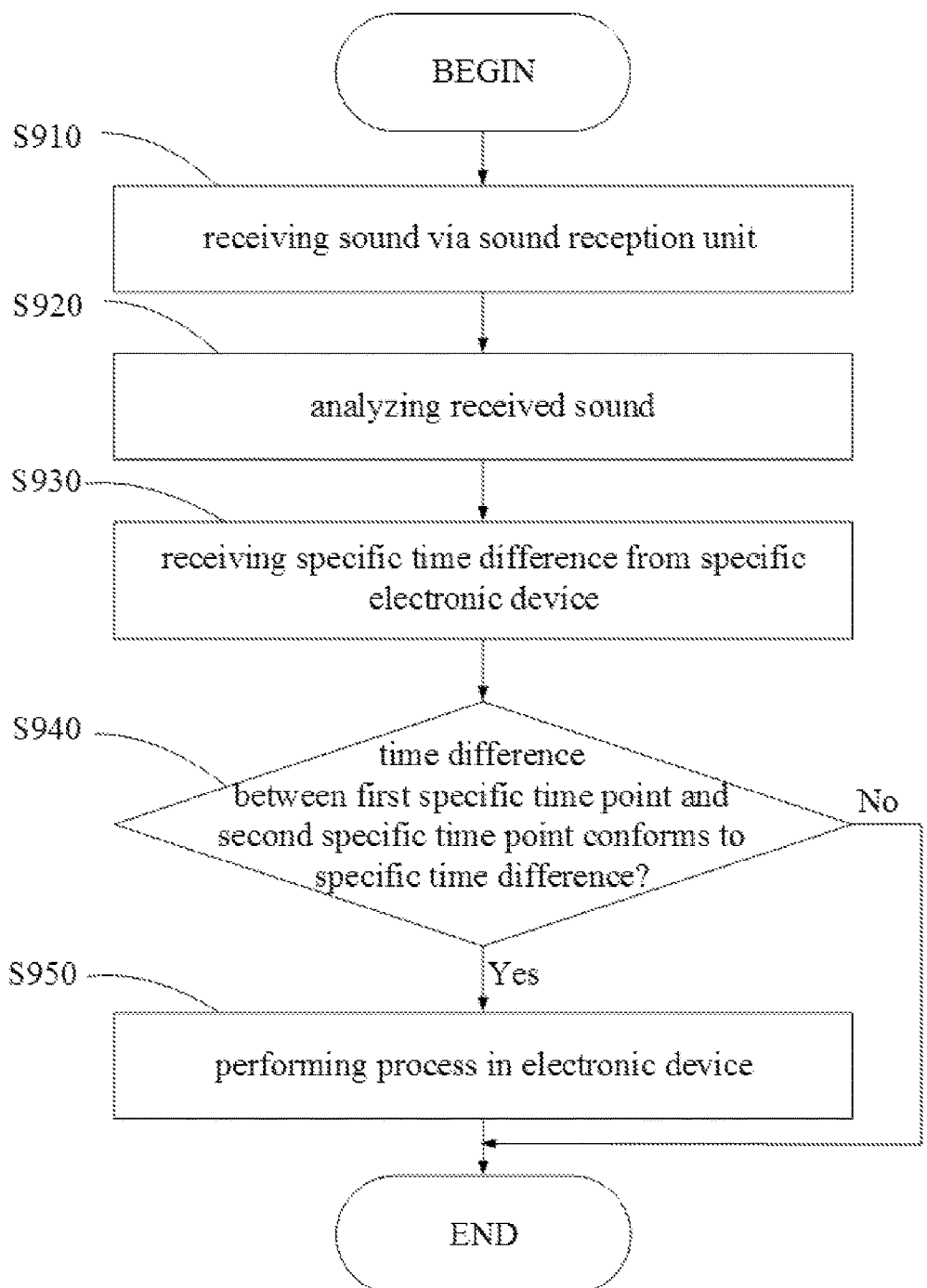
FIG. 9 is a flowchart of another embodiment of a method for commencing a process based on a sound trigger of the invention.

FIG. 9 is a flowchart of another embodiment of a method for commencing a process based on a sound trigger of the invention. The method for commencing a process based on a sound trigger can be used in an electronic device, such as a computer, or a portable device, such as a mobile phone, a smartphone, a PDA, a GPS, a notebook, or a wearable device.

Figure 10:
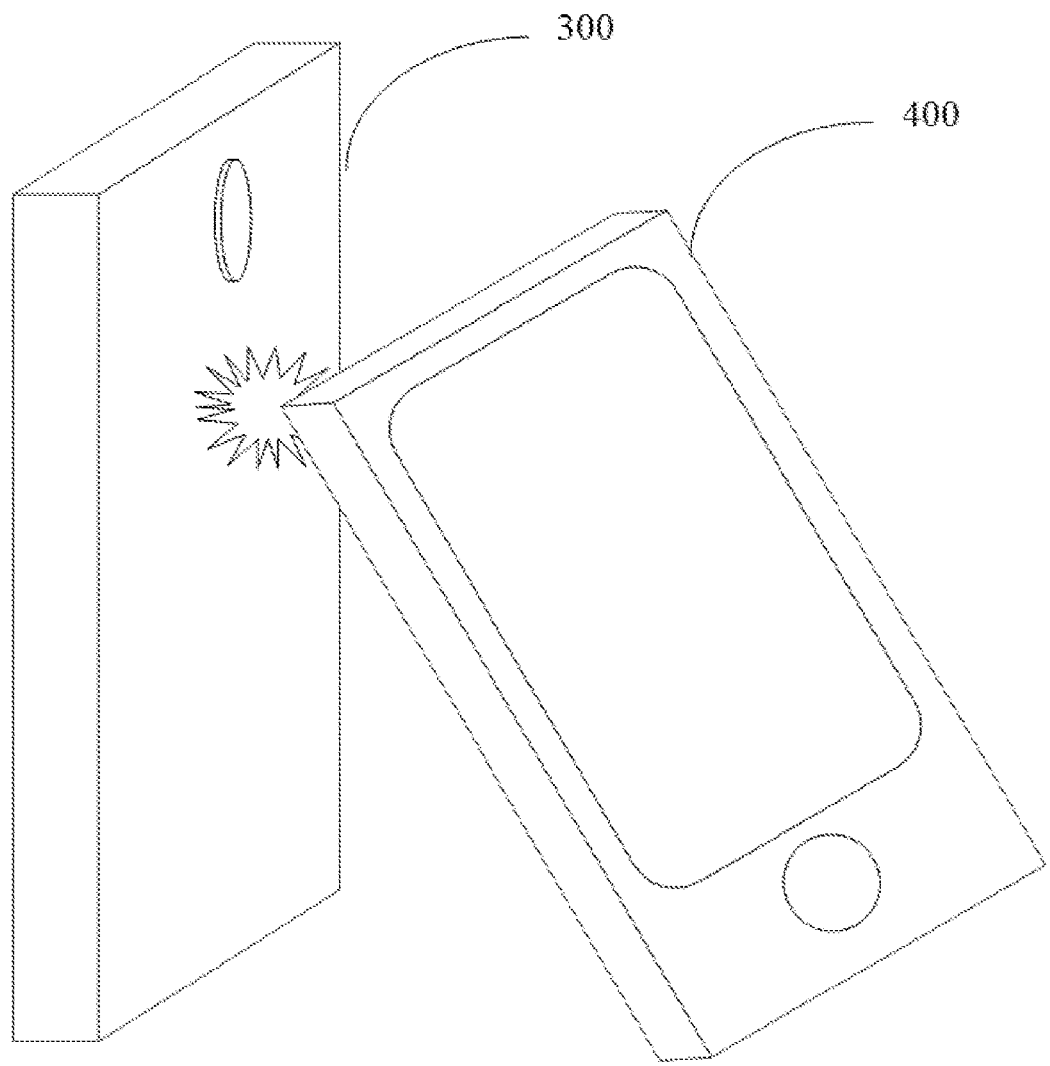
FIG. 10 is a schematic diagram illustrating another example of process commencement of the invention.

In step S910, a sound is received via a sound reception unit, such as a microphone of the electronic device. FIG. 10 is a schematic diagram illustrating another example of process commencement of the invention. In the example, two electronic devices (300 and 400) can collide with each other to generate a sound. It is noted that, the collision of two electronic devices for generating a sound is only an example of the present invention. Any manner for generating a sound can be applied in the present invention. In step S920, the sound is analyzed to obtain a first specific time point and a second specific time point, in which the intensity difference between the intensity of the sound at the first specific time point and the intensity of the sound at the preceding time point is greater than a predefined value, and the intensity difference between the intensity of the sound at the second specific time point and the intensity of the sound at the preceding time point is greater than the predefined value. In step S930, a specific time difference is received from a specific electronic device. It is understood that, in some embodiments, when the electronic device and the specific electronic device collide with each other, the specific electronic device can also receive a sound via a sound reception unit, and analyze the sound to obtain a first specific time point and a second specific time point (the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value). The specific electronic device can calculate the specific time difference according to the first specific time point and the second specific time point, and transmit the specific time difference to the electronic device via a network. In step S940, it is determined whether a time difference between the first specific time point and the second specific time point conforms to the specific time difference received from the specific electronic device. When the time difference between the first specific time point and the second specific time point does not conform to the specific time difference (No in step S940), the procedure is complete. When the time difference between the first specific time point and the second specific time point conforms to the specific time difference (Yes in step S940), in step S950, a process in the electronic device is performed. It is understood that, in some embodiments, data corresponding to the electronic device can be provided to the specific electronic device when the process is performed. In some embodiments, data corresponding to the electronic device and data corresponding to the specific electronic device are exchanged when the process is performed. It is noted that, the data may be a digital business card, identification data, a financial account, and/or account information corresponding to an application. It is noted that, the above data is only example of the present invention, and the present invention is not limited thereto.

Therefore, the methods and systems for commencing a process based on a sound trigger of the present invention can commence processes in the electronic device according to the sound received by the electronic device, thereby increasing the diversity of process management in the electronic device. In some embodiments, the security of the electronic device can be further enhanced.

Methods for commencing a process based on a sound trigger may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for commencing a process based on a sound trigger for use in an electronic device, comprising:
    obtaining a specific time difference from a specific electronic device;
    receiving a sound via a sound reception unit;
    determining whether an intensity difference between the intensity of the sound at minimally one specific time point and the intensity of the sound at a preceding time point is greater than a predefined value;
    determining whether a time difference between a first specific time point and a second specific time point conforms to the specific time difference, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value; and
    performing a process in the electronic device when the intensity difference between the intensity of the sound at the specific time point and the intensity of the sound at the preceding time point is greater than the predefined value and when the time difference between the first specific time point and the second specific time point conforms to the specific time difference.

2. The method of claim 1, further comprising:
    determining whether the intensity of the sound at the specific time point is greater than a specific threshold value; and
    performing the process in the electronic device when the intensity of the sound at the specific time point is greater than the specific threshold value, and the intensity difference is greater than the predefined value.

3. The method of claim 1, further comprising:
    detecting a motion of the electronic device by a sensor of the electronic device when the sound is received;
    determining whether the motion indicates that the electronic device generates a displacement along at least one specific axis at the specific time point; and
    performing the process in the electronic device when the motion indicates that the electronic device generates a displacement along the specific axis at the specific time point, and the intensity difference is greater than the predefined value.

4. The method of claim 1, further comprising:
    determining whether a first specific time point and a second specific time point during the sound is received are within a time interval, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value; and
    performing the process in the electronic device when the first specific time point and the second specific time point are within the time interval.

5. The method of claim 4, further comprising:
    determining whether a time difference between the first specific time point and the second specific time point conforms to a predefined value; and
    performing the process in the electronic device when the time difference conforms to the predefined value.

6. The method of claim 1, further comprising:
    detecting a presence of an object by a proximity sensor of the electronic device; and
    performing the process in the electronic device when the presence of an object is detected, and the intensity difference is greater than the predefined value.

7. The method of claim 6, further comprising:
    providing a plurality of voice messages in the electronic device; and
    performing a voice playback process for the voice messages, wherein the process controls at least one function of the voice playback process.

8. A system for commencing a process based on a sound trigger for use in an electronic device, comprising:
a sound reception unit receiving a sound; and
a processing unit obtaining a specific time difference from a specific electronic device, determining whether an intensity difference between the intensity of the sound at at least one specific time point and the intensity of the sound at a preceding time point is greater than a predefined value, determining whether a time difference between a first specific time point and a second specific time point conforms to the specific time difference, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value, and performing a process in the electronic device when the intensity difference between the intensity of the sound at the specific time point and the intensity of the sound at the preceding time point is greater than the predefined value and when the time difference between the first specific time point and the second specific time point conforms to the specific time difference.

9. A non-transitory machine-readable storage medium comprising a computer program, which, when executed, causes a device to perform a method for commencing a process based on a sound trigger, wherein the method comprises:
obtaining a specific time difference from a specific electronic device;
receiving a sound via a sound reception unit;
determining whether an intensity difference between the intensity of the sound at minimally one specific time point and the intensity of the sound at a preceding time point is greater than a predefined value;
determining whether a time difference between a first specific time point and a second specific time point conforms to the specific time difference, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value; and
performing a process in the electronic device when the intensity difference between the intensity of the sound at the specific time point and the intensity of the sound at the preceding time point is greater than the predefined value and when the time difference between the first specific time point and the second specific time point conforms to the specific time difference.

10. A method for commencing a process based on a sound trigger for use in an electronic device, comprising:
receiving a sound via a sound reception unit;
determining whether the intensity of the sound at minimally one specific time point is greater than a specific threshold value;
detecting a motion of the electronic device by a sensor of the electronic device when the sound is received;
determining whether the motion indicates that the electronic device generates a displacement along at least one specific axis at the specific time point; and
performing a process in the electronic device when the motion indicates that the electronic device generates a displacement along the specific axis at the specific time point, and the intensity of the sound at the specific time point is greater than the specific threshold value.

11. A system for commencing a process based on a sound trigger for use in an electronic device, comprising:
a sound reception unit receiving a sound;
a sensor detecting a motion of the electronic device when the sound is received; and
a processing unit determining whether the intensity of the sound at minimally one specific time point is greater than a specific threshold value, determining whether the motion indicates that the electronic device generates a displacement along at least one specific axis at the specific time point, and performing a process in the electronic device when the motion indicates that the electronic device generates a displacement along the specific axis at the specific time point, and the intensity of the sound at the specific time point is greater than the specific threshold value.

12. A non-transitory machine-readable storage medium comprising a computer program, which, when executed, causes a device to perform a method for commencing a process based on a sound trigger, wherein the method comprises:
receiving a sound via a sound reception unit;
determining whether the intensity of the sound at minimally one specific time point is greater than a specific threshold value;
detecting a motion of the electronic device by a sensor of the electronic device when the sound is received;
determining whether the motion indicates that the electronic device generates a displacement along at least one specific axis at the specific time point; and
performing a process in the electronic device when the motion indicates that the electronic device generates a displacement along the specific axis at the specific time point, and the intensity of the sound at the specific time point is greater than the specific threshold value.

13. A method for commencing a process based on a sound trigger for use in an electronic device, comprising:
receiving a sound via a sound reception unit;
determining whether an intensity difference between the intensity of the sound at minimally one specific time point and the intensity of the sound at a preceding time point is greater than a predefined value;
determining whether a first specific time point and a second specific time point during the sound is received are within a time interval, in which the intensity difference between the intensity of the sound at the first specific time point and the intensity of the sound at the preceding time point is greater than the predefined value, and the intensity difference between the intensity of the sound at the second specific time point and the intensity of the sound at the preceding time point is greater than the predefined value; and
performing a process in the electronic device when the intensity difference between the intensity of the sound at the specific time point and the intensity of the sound at the preceding time point is greater than the predefined value and when the first specific time point and the second specific time point are within the time interval.

14. The method of claim 13, further comprising:
determining whether a time difference between the first specific time point and the second specific time point conforms to a predefined value; and
performing the process in the electronic device when the time difference conforms to the predefined value.

* * * * *